United States Patent
Sugimoto

(10) Patent No.: US 7,391,545 B2
(45) Date of Patent: Jun. 24, 2008

(54) COLOR MATCHING METHOD

(75) Inventor: Hiroshi Sugimoto, Fuchu (JP)

(73) Assignee: RYOBI Ltd. (JP)

( * ) Notice: Subject to any disclaimer, the term of this patent is extended or adjusted under 35 U.S.C. 154(b) by 829 days.

(21) Appl. No.: 10/382,641

(22) Filed: Mar. 3, 2003

(65) Prior Publication Data
US 2003/0179397 A1    Sep. 25, 2003

(30) Foreign Application Priority Data
Mar. 19, 2002    (JP)    ............................ 2002-076205

(51) Int. Cl.
*G03F 3/08* (2006.01)
*G06F 15/00* (2006.01)
*G06K 9/00* (2006.01)

(52) U.S. Cl. .................... 358/521; 358/1.9; 382/167

(58) Field of Classification Search ......... 358/518–523, 358/1.9, 1.1, 1.15, 1.16, 504, 501; 382/165, 382/167, 162
See application file for complete search history.

(56) References Cited

U.S. PATENT DOCUMENTS

| | | | | |
|---|---|---|---|---|
| 4,950,577 A | * | 8/1990 | Grieve et al. ............... | 430/158 |
| 5,317,425 A | * | 5/1994 | Spence et al. ............... | 358/504 |
| 6,137,595 A | * | 10/2000 | Sakuyama et al. ........... | 358/1.9 |
| 6,324,975 B1 | * | 12/2001 | Kondo ......................... | 101/171 |
| 6,575,095 B1 | * | 6/2003 | Mahy et al. .................. | 101/485 |
| 6,995,870 B2 | * | 2/2006 | Holub ......................... | 358/1.9 |
| 7,123,379 B2 | * | 10/2006 | Nishida et al. ............... | 358/1.9 |
| 7,148,995 B2 | * | 12/2006 | Martinez et al. ............. | 358/1.9 |
| 2002/0044292 A1 | * | 4/2002 | Yamada et al. ............... | 358/1.9 |
| 2002/0149546 A1 | * | 10/2002 | Ben-Chorin et al. .......... | 345/32 |
| 2002/0154325 A1 | * | 10/2002 | Holub ......................... | 358/1.9 |
| 2002/0193956 A1 | * | 12/2002 | Van de Capelle et al. ..... | 702/81 |
| 2003/0058462 A1 | * | 3/2003 | Martinez et al. ............. | 358/1.9 |
| 2003/0156299 A1 | * | 8/2003 | Martinez et al. ............. | 358/1.9 |

OTHER PUBLICATIONS

Communication from Japanese Office (JP Patent Application No. 2002-076205), with English translation.
Reference cited in Communication Issued from Japanese Patent Office (Application No. JP Hei-10-322564).

* cited by examiner

*Primary Examiner*—Madeleine A Nguyen
(74) *Attorney, Agent, or Firm*—TIPS Group

(57) ABSTRACT

There is provided a method of providing color matching between two output devices, which includes providing gradation matching between the two output devices, and providing color matching between the two output devices after providing the gradation matching.

3 Claims, 2 Drawing Sheets

COLOR MATCHING METHOD

CROSS REFERENCE TO RELATED APPLICATION

This application claims priority from Japanese Patent Application No. 2002-076205, which is incorporated herein by reference.

BACKGROUND OF THE INVENTION

1. Field of the Invention

The present invention relates to a color matching method for providing color matching between the same type or different types of color output devices, and particularly to a color matching method for providing color matching between a color proof output device and a printing press.

2. Related Art

Frequently experienced when printing color images or output results with two different color output devices is color (hue) difference. For example, even if the same image data is inputted into and outputted from respectively a digital printing press and any other type of a printer, output results of them are likely to have color or hue different from each other.

When receiving an order from a customer for prints, a sample printout is done by the color proof printer and offered to a customer who checks whether color or hue of the printout is the same as that desired by the customer or is acceptable for the customer before providing consent for prints. Since inconsistency in color or hue between printouts of the color proof printer and the printing press may cause a trouble, color matching for matching the color characteristics therebetween is performed.

The above color matching is performed in the manner that a color bar used for color matching based upon a specific theory is inputted into and outputted from the color proof printer and the printing press to respectively produce output results, and based upon the output results, profiles of both the output devices are configured, and the color matching is provided between these output devices by utilizing the profiles.

However, the conventional color matching method does not take into account different characteristics, particularly different gradation characteristic between the output devices. If the profiles are configured based upon color bars outputted while not resolving or matching such different gradation characteristic, a proper color matching cannot be achieved due to such different gradation characteristic.

For example, the color proof printer is frequently inferior in color reproductivity in a highlighted area and shadowed area of a printout. In some cases, dots cannot be resolved in these areas and they appear to blend together, resulting in improper halftone contrast. Therefore, the performing of the color matching with different gradation characteristic existing between the printing press and the color proof printer does not enable the colors of the printouts of both devices to be easily and accurately matched to each other.

In consideration of the above problem, it is an object of the present invention to provide an improved color matching method, which achieve improved color matching accuracy as compared with the conventional color matching method.

SUMMARY OF THE INVENTION

According to a first aspect of the present invention, there is provided a method of providing color matching between two output devices, which includes providing gradation matching between the two output devices, and providing color matching between the two output devices after providing the gradation matching. By this method, highly accurate color-matching can be realized as compared with a conventional method.

According to a second aspect of the present invention, there is provided a method of providing color matching between first and second output devices, which includes inputting gradation data, which has been corrected so as to match gradation of the first output device to gradation of the second output device, into the first output device and making the first output device output the data to produce an output result, inputting gradation data, which has not been corrected, into the second output device and making the second output device output the data to produce an output result, and color matching between the first and second output devices based upon the output results of the first and second output devices. By this method, it is possible to easily provide gradation matching between the output devices.

According to a third aspect of the present invention, there is provided a method of providing color matching between a color proof output device and a printing press, which includes inputting color bar data, which has been corrected so as to match gradation of the color proof output device to gradation of the printing press, into the color proof output device and making the color proof output device output the data to produce an output result, inputting color bar data, which has not been corrected, into the printing press and making the printing press output the data to produce an output result, measuring colors of the output results by a calorimeter to produce measured results, and color matching between the color proof output device and the printing press based upon the measured results. By utilizing the color bar data and measuring color thereof by the colorimeter, it is possible to contribute to ease of color matching as well as ease of color measuring.

According to a fourth aspect of the present invention, there is provided a method of providing color matching between two output devices by using profiles thereof, which includes providing color matching between the two output devices based upon profiles which have been configured after gradations of the two output devices are matched to each other. By utilizing the profiles, the color matching can be easily performed.

According to a fifth aspect of the present invention, there is provided a method of providing color matching between first and second output devices by using profiles thereof, which includes inputting gradation data, which has been corrected so as to match gradation of the first output device to gradation of the second output device, into the first output device and making the first output device output the data to produce an output result, inputting gradation data, which has not been corrected, into the second output device and making the second output device output the data to produce an output result, configuring profiles of the first and second output devices based upon the output results, and color matching between the first and second output devices based upon the profiles.

According to a sixth aspect of the present invention, there is provided a method of providing color matching between a color proof output device and a printing press by using profiles thereof, which includes inputting color bar data, which has been corrected so as to match gradation of the color proof output device to gradation of the printing press, into the color proof output device and making the color proof output device output the data to produce an output result, inputting color bar data, which has not been corrected, into the printing press and making the printing press output the data to produce an output result, measuring colors of the output results by a colorimeter to produce measured results, configuring profiles of the color proof output device and the printing press based upon the measured results, and color matching between the color proof output device and the printing press based upon the profiles.

Preferably, in the above method, the same color bar data is inputted into the color proof output device and the printing press respectively and the data is outputted by them so as to respectively produce output results. Gradations of the output results are respectively measured so as to produce measured results. The color bar data is corrected based upon the measured results in such a manner as to match the gradation of the color proof output device to the gradation of the printing press, and gradation-corrected color bar data is inputted into the color proof output device and the gradation-corrected color bar data is outputted by the color proof output device.

Preferably, the same color bar data is inputted into the color proof output device and the printing press respectively and the color bar data is outputted by them to respectively produce output results. Gradation of the output result of the color proof output device is measured by a calorimeter so as to produce a gradation result while gradation and color of the output result of the printing press are simultaneously measured by the colorimeter so as to produce a gradation result and a color result. A profile of the printing press is configured based upon the color result of the printing press, and the color bar data is corrected based upon the gradation results in such a manner as to match the gradation of the color proof output device to the gradation of the printing press. Gradation-corrected color bar data is inputted into the color proof output device and the gradation-corrected color bar data is outputted by the color proof output device to produce an output result. Then, color of the output result is again measured to produce a color result of the output result, a profile of the color proof output device is configured based upon the color result of the output result of the color proof output device, and color matching is provided between the color proof output device and the printing press based upon the profiles of the color proof output device and the printing press.

By the above method, the gradation correction and color matching can be well associated with each other, thus achieving an efficient color matching processing.

In the above method, preferably color matching processing of an image data to be inputted into the color proof output device is performed with a color characteristic of the printing press designated as a color matching target in such a manner as to have a color characteristic of the color proof output device matched to the color characteristic of the printing press.

In the present invention, the "matching" of gradation, color characteristics and the like includes approximating of gradation, color characteristics and the like.

BRIEF DESCRIPTION OF THE DRAWINGS

The above, and other objects, features and advantages of the present invention will become apparent from the detailed description thereof in conjunction with the accompanying drawings wherein.

DESCRIPTION OF THE PREFERRED EMBODIMENTS

An embodiment of the present invention will be herein described with reference to the drawings attached hereto.

Figure 1:
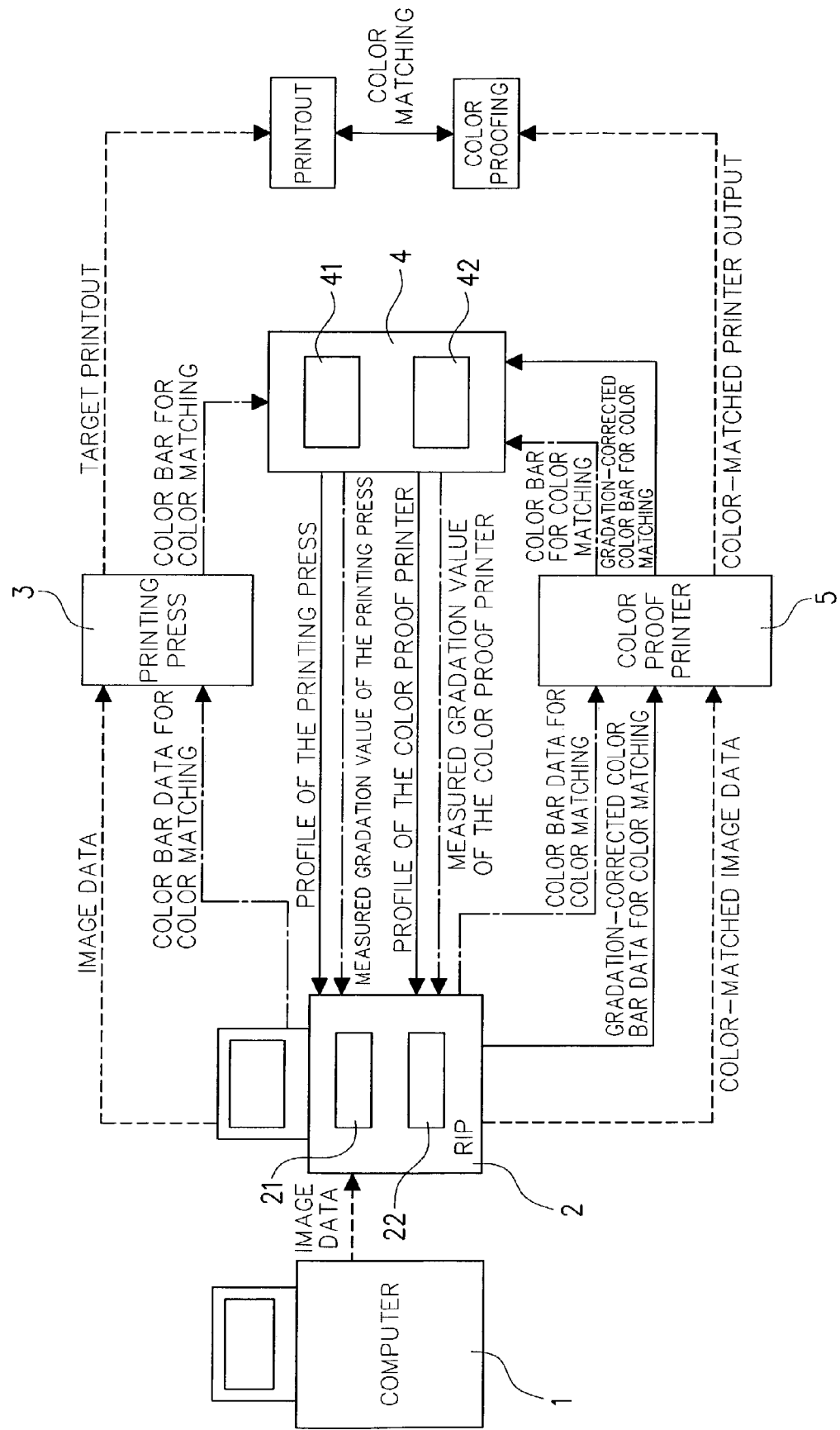
FIG. 1 is a block diagram illustrating the structure of a printing system to which the color matching method according to one embodiment of the present invention is applied.

Referring to FIG. 1, which illustrates a block diagram of the structure of the printing system, computer 1 with various general software applications installed is used to such as create image data and color bars for color matching, create and process other types of data, and inputting and outputting various data. A color bar for color matching is printed on a predetermined position in the margin of a sheet. The color bar shows gradients of cyan, magenta, yellow and black dots. Specifically, the color bar is made up of individual color patches of various ink colors and tones with the color patches laid out in a row side by side.

Printing press 3 (output device) is a so called digital printing press, which is provided with a direct imaging mechanism located near a printing cylinder so as to form on a printing plate an image corresponding to image data (bitmap data) inputted thereinto and hence print out or output the image. The printing press is of a multi-color printing type that can print in for example four colors (cyan, magenta, yellow and black). Color proof printer 5 (color proof output device) is used for color proofing of a final product to match the color to that as desired by the customer before mass printing by the printing press.

A color matching system of this embodiment is structured to provide color matching between the printing press 3 and the color proof printer 5. Specifically, the color matching system includes RIP (Raster Image Processor) device 2 for processing image data or any other type of data, which are inputted through the computer 1, into a format that can be inputted into the printing press, the color proof printer and the like, and profiling means 4 for configuring a profile used for color matching.

The profiling means 4 includes measuring part 41 for measuring an outputted color bar ("color bar measuring part"), and calculation part 42 for configuring a profile based upon the measured result of the measuring part 41. Specifically, a calorimeter is used as the measuring part 41, which scans the color bar so as to measure the color of the same and output calorimetric value as a measured result, and measure gradation of the color bar and output measured gradation value as a measured result. That is, the calorimeter is capable of simultaneously measuring color and gradation. This calorimeter may be of either a manual or automatic scan type. The calculation part 42 compares between a reference value of the halftone dot percent previously set relative to the color bar and a calorimetric value measured by the calorimeter, thereby configuring a profile in the form of a color conversion table for color conversion of the image data. In this embodiment, a profile of the printing press 3 and a profile of the color proof printer 5 are configured based upon the measured results of the color bars, which are respectively outputted by these output devices. A profile used represents a color characteristic (color reproductivity) of each output device. For this, an ICC (International Color Consortium) profile is generally used.

Installed on the RIP device 2 is software that acts as color matching part 21 for color matching (color correction) of the image data outputted by the computer for matching the color characteristics of the printing press 3 and the color proof printer 5 based upon the profiles configured by the calculation part 42 of the profiling means 4, and gradation matching part 22 for providing gradation matching (gradation correction) of the color bar prepared for the color matching based upon the gradation value measured by the measuring part 41 of the profiling means 4. There are various methods for gradation value matching (gradation correction), such as a method comprising providing halftone dot correction across the entire tone values between a highlighted area (brightest area) and a shadowed area (darkest area) based upon a tone curve. In either case, the gradation correction is performed so as to provide gradation matching between the printing press 3 and the color proof printer 5. In this embodiment, gradation-corrected color bar data is formed by gradation correction of color bar data inputted into the color proof printer 5 so as to match the gradation of the color proof printer 5 to the gradation of the printing press 3 as a target. More specifically, a color bar for color matching, which is outputted by the printing press 3 and a color bar for color matching, which is outputted by the color proof printer 5 are respectively measured by the colorimeter for their gradations, and a comparative table is prepared so as to compare between these measured gradation values. In this comparative table, each halftone dot percent (tone value) in the color bar data for color matching and its corresponding output halftone dot percents of both the printing press 3 and the color proof printer 5 are inputted. Then, the gradation correction is provided based upon the prepared comparative table. This comparative table is prepared for each color.

Figure 2:
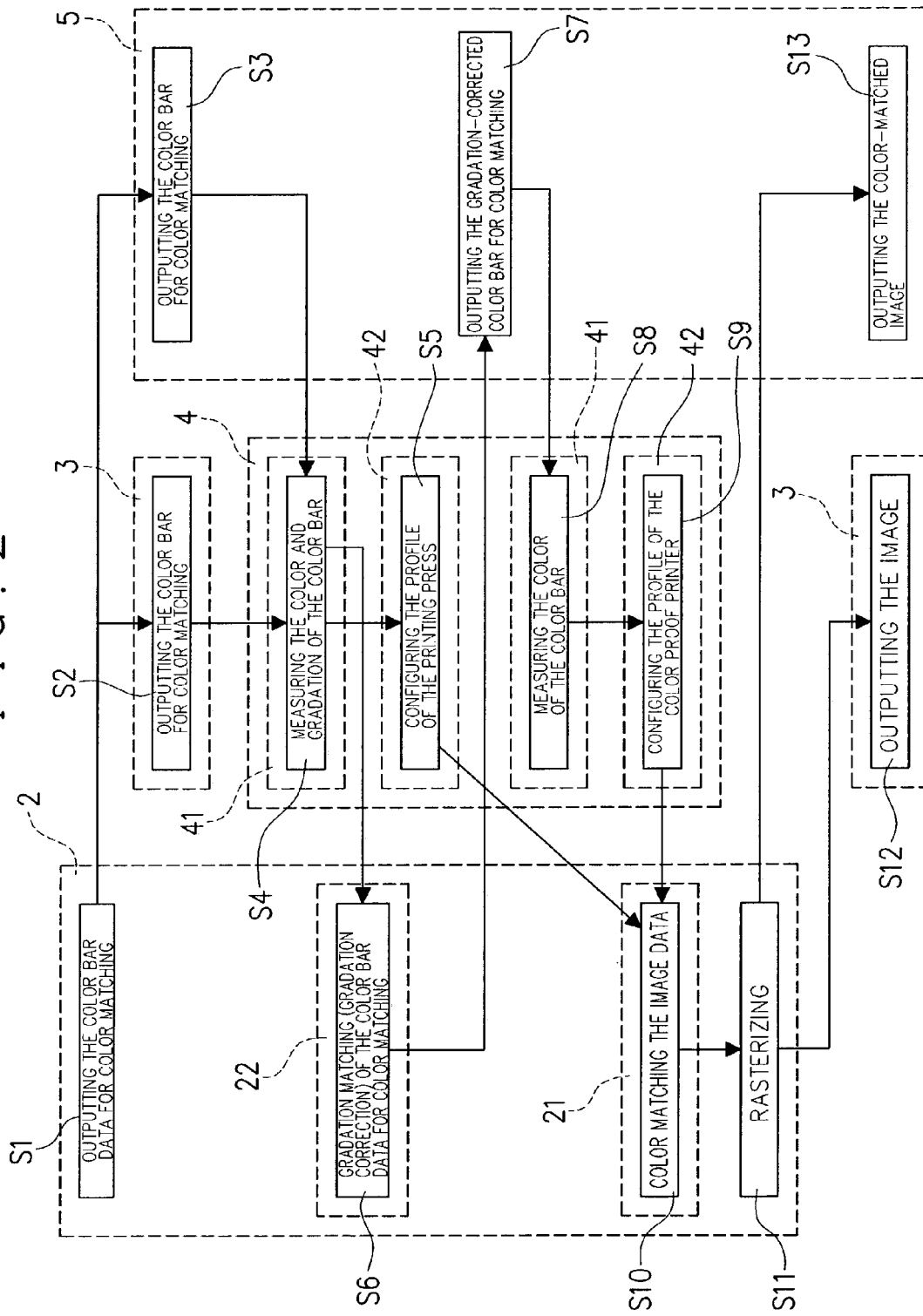
FIG. 2 is a flow chart illustrating procedures of the color matching according to one embodiment of the present invention.

Now, the description will be made for the color matching method of this embodiment with reference to the flow chart as illustrated in FIG. 2.

First, color bar data for color matching is outputted from the RIP device 2 (Step S1). The color bar data for color matching is inputted into the printing press 3 and the color proof printer 5, respectively. That is, the same color bar data is inputted into the printing press 3 and the color proof printer 5. The printing press 3 outputs a color bar for color matching corresponding to the color bar data inputted (Step S2), while the color proof printer 5 outputs a color bar for color matching corresponding to the color bar data inputted (Step S3).

Next, the output of the printing press 3 is then set on the colorimeter and the color bar thereon is scanned so that the simultaneous measuring of the color and gradation is made (Step S4). The calorimetric value of the measured data is sent to the calculation part 42, while the gradation value measured is sent to the gradation matching part 22 of the RIP device 2. The calculation part 42 configures a profile of the printing press 3 based upon the calorimetric value sent thereto (Step S5), and sends the profile to the color matching part 21 of the RIP device 2. Then, the output of the color proof printer 5 is scanned and its color and gradation are measured by the colorimeter in the same manner as the above (Step S4). In this regard, the measured gradation value is sent to the gradation matching part 22, but the calorimetric value is not sent to the calculation part 42. Accordingly, in this stage, a profile of the color proof printer 5 is not configured at the calculation part 42.

At the gradation matching part 22 of the RIP device 2, the gradations of the color bar data for color matching are corrected based upon the measured gradation values of both the printing press 3 and the color proof printer 5 inputted through the colorimeter so as to match the gradation of the color proof printer 5 to a target, that is, the gradation of the printing press 3, thereby forming gradation-corrected color bar data, which is then inputted into the color proof printer 5 (Step S6). The color proof printer 5 outputs a color bar for color matching with its gradation corrected, which corresponds to the gradation-corrected color bar data for color matching, which was inputted thereinto (Step S7).

The output with the color bar whose gradation has been corrected is set on the calorimeter and the color of the color bar is again measured (Step S8). At this time, the gradation is also automatically measured, although its measured value is not used. The colorimetric value as a measured result is sent to the calculation part 42, at which a profile of the color proof printer 5 is configured and sent to the color matching part 21 of the RIP device 2 (Step S9).

Once the profile of the color proof printer 5 is inputted into the color matching part 21, the color matching part 21 processes an image data of a printing image so as to have the color characteristic of the color proof printer 5 matched to the color characteristic of the printing press 3 based upon the profile of the color proof printer 5 inputted at this time along with the profile of the printing press 3 previously inputted and stored (Step S10). That is, color conversion is made for the image data.

Then, the image data that has been formed by the color matching processing and an original image data that has not been subjected to the color matching processing are both rasterized (Step S11), and then respectively inputted into the color proof printer 5 and the printing press 3. Accordingly, the printing press 3 outputs an image corresponding to the inputted image data, thus producing an output as a target of the color proof printer 5 (Step S12), while the color proof printer 5 outputs a color-matched image corresponding to the input color-matched image data, thus producing a color-matched output (Step S13). Thus, the color-matched output possesses the color reproductivity, which is approximate to the target printout.

The above described color matching processing, which necessitates producing the gradation matching between the printing press 3 and the color proof printer 5 before the color matching therebetween, can realize highly accurate color-matching as compared with a conventional method, which does not perform the gradation matching.

The use of color bar data can realize the simultaneous measuring of color and gradation by the calorimeter, which contributes to ease of gradation matching and color matching. Particularly, since the gradation correction is made based upon the output results of the printing press and the color proof printer which are produced by inputting the same color bar data into these output devices and making them output the data, it is possible to enable easy and highly accurate gradation correction.

On the other hand, the color matching by using profiles of the respective output devices can realize ease of color matching. This processing involves first configuring the profile of the printing press 3 based upon the measured colorimetric value of the color bar and storing the same, while configuring the profile of the color proof printer 5 after the gradation correction based upon the measured colorimetric value of the color bar with its gradation corrected, and then providing the color matching based upon both the profiles. Thus, the profile of the printing press 3 can be configured by the effective use of the step of respectively measuring the color bars of the printing press 3 and the color proof printer 5 for the gradation correction. As a result, efficient profile configuration can be realized.

In addition to the above, since both the gradation matching and color matching are performed aiming at the printing press 3, highly accurate color matching can be further enhanced as compared with the matching processing, in which, for example, the gradation matching and color matching are made respectively aiming at different targets.

In this embodiment, the single color bar is shared for both the gradation correction and color matching. Alternatively, it is possible to prepare separate color bars respectively used for the gradation correction and the color matching. However, sharing of the single color bar contributes to ease of data administration, as well as is advantageous in the fact that one of the profiles can be configured by the effective utilization of the measured calorimetric value, which is produced when measuring the color bar for gradation correction.

This embodiment has been described by taking, for example, the color matching produced between the printing press 3 and the color proof printer 5. However, it is a matter of course that the present invention can be applied to the color matching between two printing presses 3 and hence to the color matching between various output devices. Also, the present invention can be applied to the case where the color matching of the printing press 3 is performed aiming at the color proof printer 5.

This specification is by no means intended to restrict the present invention to the preferred embodiments set forth therein. Various modifications to the color matching method, as described herein, may be made by those skilled in the art without departing from the spirit and scope of the present invention as defined in the appended claims.

What is claimed is:

1. A method of providing color matching between a color proof output device and a printing press comprising inputting color bar data, said color bar data showing gradients of cyan, magenta, yellow and black dots and said color bar data having been corrected so as to match gradation of said color proof output device to gradation of said printing press, into said color proof output device and making said color proof output device output said data to produce an output result, inputting color bar data, said color bar data showing gradients of cyan, magenta, yellow and black dots and said color bar data having its gradation not corrected, into said printing press and making said printing press output said data to produce an output result, measuring colors of said output results by a colorimeter to produce measured results, and color matching between said color proof output device and said printing press based upon said measured results.

2. A method of providing color matching between a color proof output device and a printing press by using profiles thereof comprising inputting color bar data, said color bar data showing gradients of cyan, magenta, yellow and black dots and said color bar data having been corrected so as to match gradation of said color proof output device to gradation of said printing press, into said color proof output device and making said color proof output device output said data to produce an output result, inputting color bar data, said color bar data showing gradients of cyan, magenta, yellow and black dots and said color bar data having its gradation not corrected, into said printing press and making said printing press output said data to produce an output result, measuring colors of said output results by a colorimeter to produce measured results, configuring profiles of said color proof output device and said printing press based upon said measured results, and color matching between said color proof output device and said printing press based upon said profiles.

3. A method of providing color matching according to claim 2, wherein the same color bar data is inputted into said color proof output device and said printing press respectively and said data is outputted by them so as to respectively produce output results, gradations of said output results are respectively measured so as to produce measured results, said color bar data is corrected based upon said measured results in such a manner as to match the gradation of said color proof output device to the gradation of said printing press, and gradation-corrected color bar data is inputted into said color proof output device and said gradation-corrected color bar data is outputted by said color proof output device.

* * * * *